United States Patent
Fujisaki (10) Patent No.: US 12,235,421 B2
(45) Date of Patent: Feb. 25, 2025

(54) OPTICAL SYSTEM, IMAGE PICKUP APPARATUS, AND LENS APPARATUS

(71) Applicant: CANON KABUSHIKI KAISHA, Tokyo (JP)

(72) Inventor: Toyokatsu Fujisaki, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 35 days.

(21) Appl. No.: 17/154,143

(22) Filed: Jan. 21, 2021

(65) Prior Publication Data

US 2021/0231929 A1 Jul. 29, 2021

(30) Foreign Application Priority Data

Jan. 27, 2020 (JP) .................................. 2020-011125

(51) Int. Cl.
*G02B 15/14* (2006.01)
*G02B 15/20* (2006.01)
*G02B 27/00* (2006.01)

(52) U.S. Cl.
CPC ..... *G02B 15/143107* (2019.08); *G02B 15/20* (2013.01); *G02B 27/0025* (2013.01)

(58) Field of Classification Search
CPC .......... G02B 9/08; G02B 9/24; G02B 13/006; G02B 13/009; G02B 13/08; G02B 15/00; G02B 15/08; G02B 15/14; G02B 15/143; G02B 15/143107; G02B 15/167; G02B 15/22; G02B 15/144107; G02B 15/20; G02B 27/0025; G02B 3/0062; G02B 3/0087; G02B 15/24; G02B 15/177; G02B 9/40; G02B 9/42; G02B 15/142; G02B 15/144115; G02B 15/145107;
(Continued)

(56) References Cited

U.S. PATENT DOCUMENTS 6,014,265 A * 1/2000 Kato ............... G02B 15/144107
359/686
8,184,378 B2 * 5/2012 Chia .................... G02B 13/009
359/689

(Continued)

FOREIGN PATENT DOCUMENTS

JP 2001-183581 A 7/2001
JP 2004151619 A 5/2004
(Continued)

OTHER PUBLICATIONS

English translation of JP-2019113576-A (Jul. 11, 2019).*
(Continued)

*Primary Examiner* — Thomas K Pham
*Assistant Examiner* — Kuei-Jen L Edenfield
(74) *Attorney, Agent, or Firm* — Carter, DeLuca & Farrell LLP (57) ABSTRACT

An optical system includes, in order from an object side to an image side, a first lens unit having a positive refractive power, a second lens unit having a positive refractive power, and a third lens unit having a positive refractive power. During focusing from infinity to a short distance, the first lens unit is fixed, and the second lens unit and the third lens unit are moved so that a distance between the second lens unit and the third lens unit changes. Predetermined conditions are satisfied.

26 Claims, 9 Drawing Sheets

(58) Field of Classification Search
CPC .... G02B 15/145115; G02B 15/145123; G02B 15/145131; G03B 13/32; G03B 17/12; H04N 23/55
USPC ....... 359/689, 698, 739, 745, 792, 676, 705, 359/779, 780, 784, 368, 362, 366
See application file for complete search history.

(56) References Cited

U.S. PATENT DOCUMENTS

| | | | | |
|---|---|---|---|---|
| 8,654,448 | B2* | 2/2014 | Morooka | G02B 15/143103 359/716 |
| 2012/0147251 | A1* | 6/2012 | Matsuzawa | G02B 15/143107 359/689 |
| 2017/0351059 | A1* | 12/2017 | Gyoda | G02B 13/02 |
| 2018/0372986 | A1 | 12/2018 | Maruyama | |
| 2019/0101732 | A1* | 4/2019 | Yuki | G02B 13/18 |
| 2021/0341709 | A1* | 11/2021 | Kawamura | G02B 9/08 |

FOREIGN PATENT DOCUMENTS

| | | | |
|---|---|---|---|
| JP | 2014-048488 A | 3/2014 | |
| JP | 2019-066585 A | 4/2019 | |
| JP | 2019113576 A * | 7/2019 | ............. G02B 13/04 |
| JP | 2019-197125 A | 11/2019 | |

OTHER PUBLICATIONS

Notice of Reasons for Refusal issued by the Japanese Patent Office on Dec. 12, 2023 in corresponding JP Patent Application No. 2020-011125, with English translation.

Notice of Reasons for Refusal issued by the Japanese Patent Office on Sep. 19, 2023 in corresponding JP Patent Application No. 2020-011125, with English translation.

Korean Office Action issued in corresponding KR Patent Application No. 10-2021-0009097, dated Sep. 3, 2024, with English translation.

Notice of Reasons for Refusal issued by the Japanese Patent Office on Jan. 7, 2025 in corresponding JP Patent Application No. 2024-055266, with English translation.

* cited by examiner

OPTICAL SYSTEM, IMAGE PICKUP APPARATUS, AND LENS APPARATUS

BACKGROUND OF THE INVENTION

Field of the Invention

The present invention relates to an optical system, an image pickup apparatus, and a lens apparatus, and more particularly to those suitable for a lens in an image pickup apparatus such as a digital still camera, a video camera, a surveillance camera, a broadcasting camera, and a film-based camera.

Description of the Related Art

Image pickup apparatuses such as a digital still camera, a video camera, a surveillance camera, a broadcasting camera, and a film-based camera using a solid-state image sensor have recently become more sophisticated. A focus unit in the optical system used for such an image pickup apparatus is demanded smaller as a whole. The optical system is also demanded to satisfactorily correct a chromatic aberration, a curvature of field, etc. during imaging at the short distance while increasing the imaging magnification during focusing from (an object at) infinity to (an object at) a shortest distance. In addition, as large cameras tend to use mirrorless (non-reflex) structures, a compact lens having a short backfocus and a large diameter is demanded. One conventional optical system that satisfies these requirements includes, in order from an object side to an image side, a lens unit having a positive refractive power, a focus lens unit having a positive refractive power, and a focus lens unit having a positive refractive power (see Japanese Patent Laid-Open No. ("JP") 2014-48488.

In the optical systems of JP 2014-48488, the backfocus is long and the size reduction is insufficient because the refractive power of the lens unit having a positive refractive power (reciprocal of the focal length) and closest to the object is too weak. Moreover, the total number of focus units is large, which is not suitable to reduce the size and weight of the focus unit.

SUMMARY OF THE INVENTION

The present invention provides an optical system, an image pickup apparatus, and a lens apparatus, each of which can satisfactorily correct a chromatic aberration and a curvature of field during imaging at all object distances from infinity to a short distance while reducing an overall length and a size of an entire focus unit.

An optical system according to one aspect of the present invention includes, in order from an object side to an image side, a first lens unit having a positive refractive power, a second lens unit having a positive refractive power, and a third lens unit having a positive refractive power. During focusing from infinity to a short distance, the first lens unit is fixed, and the second lens unit and the third lens unit are moved so that a distance between the second lens unit and the third lens unit changes. The following conditions are satisfied:

$$0.01 < f1/f < 2.60$$

$$0.50 < f2/f3 < 30.00$$

where f is a focal length of the optical system in an in-focus state on infinity, and f1, f2, and f3 are focal lengths of the first lens unit, the second lens unit, and the third lens unit, respectively.

An image pickup apparatus and a lens apparatus each having the above optical system also constitute another aspect of the present invention.

Further features of the present invention will become apparent from the following description of exemplary embodiments with reference to the attached drawings.

DESCRIPTION OF THE EMBODIMENTS

This embodiment provides an optical system, an image pickup apparatus, and a lens apparatus, each of which can satisfactorily correct a chromatic aberration and a curvature of field during imaging at all object distances from infinity to a short distance while reducing an overall length and a size of an entire focus unit.

The optical system according to this embodiment includes, in order from an object side to an image side, a first lens unit L1 having a positive refractive power, a second lens unit L2 having a positive refractive power, and a third lens unit L3 having a positive refractive power. During focusing from infinity to a short distance, the first lens unit L1 is fixed, and the second lens unit L2 and the third lens unit L3 are moved so that a distance between them is changed. Due to this configuration, the optical system according to this embodiment can suppress the spherical aberration, the curvature of field, and the lateral chromatic aberration in the overall imaging range during focusing from infinity to a short distance.

The optical system according to this embodiment satisfies the following conditions:

$$0.01 < f1/f < 2.60 \quad (1)$$

$$0.50 < f2/f3 < 30.00 \quad (2)$$

where f is a focal length of the optical system in an in-focus state on infinity, and f1, f2, and f3 are focal lengths of the first lens unit L1, the second lens unit L2, and the third lens unit L3, respectively.

The conditional expression (1) properly sets a ratio between the focal length of the first lens unit L1 and the focal length of the optical system during focusing on infinity. If the value is higher than the upper limit in the conditional expression (1), the focal length of the first lens unit L1 becomes excessively long, the backfocus becomes long, and it becomes difficult to reduce the overall length. If the value is lower than the lower limit in the conditional expression (1), the focal length of the first lens unit L1 becomes excessively small, and it becomes difficult to correct mainly the spherical aberration, the longitudinal chromatic aberration, etc., particularly in a large diameter lens.

The conditional expression (2) properly sets a ratio between the focal length of the second lens unit L2 and the focal length of the third lens unit L3. If the value is higher than the upper limit in the conditional expression (2), the focal length of the second lens unit L2 becomes excessively long, and the second lens unit L2, which is the focus unit, becomes undesirably large. If the value is lower than the lower limit in the conditional expression (2), the focal length of the third lens unit L3 becomes excessively long, and the third lens unit L3, which is the focus unit, becomes undesirably large.

The numerical range of each conditional expression may be set as follows:

$$0.01 < f1/f < 2.55 \quad (1a)$$

$$0.70 < f2/f3 < 20.00 \quad (2a)$$

The numerical range of each conditional expression may be set as follows.

$$0.01 < f1/f < 2.50 \quad (1b)$$

$$0.90 < f2/f3 < 10.00 \quad (2b)$$

By satisfying the above configuration and conditional expressions, this embodiment provides an optical system, an image pickup apparatus, and a lens apparatus, each of which can satisfactorily correct a chromatic aberration and a curvature of field during imaging at all object distances from infinity to a short distance while reducing an overall length and a size of an entire focus unit.

The optical system according to this embodiment may satisfy one or more of the following conditional expressions.

$$0.01 < sk/f < 1.00 \quad (3)$$

$$0.01 < sk/f2 < 0.30 \quad (4)$$

$$0.01 < TG2/f2 < 0.10 \quad (5)$$

$$0.10 < TG2/TG3 < 3.00 \quad (6)$$

$$0.20 < DG12/f1 < 1.00 \quad (7)$$

$$0.01 < FL2/f2 < 0.20 \quad (8)$$

$$1.00 < FL2/FL3 < 3.00 \quad (9)$$

$$0.05 < f/X1 < 3.00 \quad (10)$$

Here, sk is a backfocus of the optical system during focusing on infinity, TG2 and TG3 are thicknesses of the second lens unit L2 and the third lens unit L3 in the optical axis direction, respectively, and DG12 is a distance between the first lens unit L1 and the second lens unit L2. FL2 and FL3 are moving amounts (drawing amounts whose sign is positive when the lens unit is drawn to the object side) of the second lens unit L2 and the third lens unit L3 from focusing on infinity to focusing on an object 500 mm apart from the image plane, respectively. X1 is a distance from the diaphragm (aperture stop) to the image plane during focusing on infinity. The thickness of the lens unit in the optical axis direction refers to a distance on the optical axis from the lens surface closest to the object in the lens unit to the lens surface closest to the image in the lens unit.

The conditional expression (3) properly sets a ratio between the focal length of the optical system and the backfocus during focusing on infinity. If the value is higher than the upper limit in the conditional expression (3), the backfocus becomes excessively long relative to the focal length of the optical system, and it becomes difficult to reduce the overall length. On the other hand, if the value is lower than the lower limit in the conditional expression (3), the backfocus becomes too short relative to the focal length of the optical system, and the incident angle on the sensor becomes undesirably tight and the chromatic aberration of the peripheral portion deteriorates.

The conditional expression (4) properly sets a ratio between the focal length of the second lens unit L2 and the backfocus during focusing on infinity. If the value is higher than the upper limit in the conditional expression (4), the backfocus becomes too long relative to the focal length of the second lens unit L2, and it becomes difficult to shorten the overall length. When the value is lower than the lower limit in the conditional expression (4), the focal length of the second lens unit L2 becomes too short, the moving amount during focusing on the short distance becomes relatively large relative to the backfocus, and the overall length becomes undesirably long.

The conditional expression (5) properly sets a ratio between the thickness and the focal length of the second lens unit L2, which is the first focus unit. If the value is higher than the upper limit in the conditional expression (5), the second lens unit L2 becomes too thick to reduce the weight of the focus lens unit. On the other hand, if the value is lower than the lower limit in the conditional expression (5), the power of the focus lens unit becomes too loose, and a focus moving amount becomes large and undesirably hinders a compact configuration.

The conditional expression (6) properly sets a ratio between the thickness of the second lens unit L2, which is the first focus unit, and the thickness of the third lens unit L3, which is the second focus lens unit. If the value is higher than the upper limit in the conditional expression (6), the second lens unit L2 becomes too thick. Therefore, the first focus lens unit becomes too heavy relative to the weight of the second focus lens unit and undesirably prevents the weight reduction. If the value is lower than the lower limit in the conditional expression (6), the third lens unit L3 becomes too thick, and the second focus lens unit becomes too heavy relative to the first focus lens unit. Thus, this configuration undesirably prevents the reduction in size and weight.

The conditional expression (7) properly sets a ratio between the distance DG12 between the first lens unit L1 and the second lens unit L2, and the focal length of the first lens unit L1. If the value is higher than the upper limit in the conditional expression (7), the overall length becomes long, which undesirably hinders a small configuration. If the value is lower than the lower limit in the conditional expression (7), the power of the first lens unit L1 becomes too loose and the front lens diameter becomes undesirably large. In addition, the distance DG12 between the first lens unit L1 and the second lens unit L2 becomes too small and undesirably makes it difficult to focus on the short distance.

The conditional expression (8) properly sets a ratio between the moving amount FL2 of the second lens unit L2 from focusing on infinity to focusing on an object 500 mm apart from the image plane and the focal length f2 of the second lens unit L2 which is the first focus lens unit. If the value is higher than the upper limit in the conditional expression (8), the power of the second lens unit L2 becomes too strong, and the performance deteriorates during focusing on the short distance. If the value is lower than the lower limit in the conditional expression (8), the power of the second lens unit L2 becomes too loose and the focus moving amount becomes large and prevents the miniaturization.

The conditional expression (9) properly sets a ratio between the moving amount FL2 of the second lens unit L2 from focusing on infinity to focusing on the object 500 mm apart from the image plane and the moving amount FL3 of the third lens unit L3 from focusing on infinity to focusing on the object 500 mm apart from the image plane. If the value is higher than the upper limit in the conditional expression (9), the moving amount of the second lens unit L2 becomes too large, and the mechanical mechanism for moving the second lens unit L2, which is the first focus unit, becomes undesirably large. In addition, the angle of view during motion image capturing undesirably significantly changes. If the value is lower than the lower limit in the conditional expression (9), the moving amount of the third lens unit L3 becomes too large, and the mechanical mechanism for moving the third lens unit L3, which is the second focus unit, becomes undesirably large.

The conditional expression (10) properly sets a ratio between the distance X1 from the diaphragm to the image plane during focusing on infinity and the focal length f of the optical system. If the value is higher than the upper limit in the conditional expression (10), the distance from the diaphragm to the image plane during focusing on infinity and the focal length of the optical system become too short, and the exit pupil position in the optical system approaches to the image plane. As a result, it becomes difficult to secure the telecentricity in a range compatible with the electronic image sensor (solid-state image sensor). If the value is lower than the lower limit in the conditional expression (10), the distance from the diaphragm to the image plane during focusing on infinity and the focal length of the optical system becomes too long, and it is difficult to suppress the overall length of the optical system.

Satisfying the above configuration and conditional expressions can provide an optical system that can satisfactorily correct the chromatic aberration, the curvature of field, etc. during imaging at all object distances from infinity to the short distance while reducing the overall length and the size of the entire focus unit.

The numerical range of each conditional expression (3) to (10) may be set as follows:

$$0.05 < sk/f < 0.90 \quad (3a)$$

$$0.01 < sk/f2 < 0.25 \quad (4a)$$

$$0.01 < TG2/f2 < 0.09 \quad (5a)$$

$$0.2 < TG2/TG3 < 2.50 \quad (6a)$$

$$0.20 < DG12/f1 < 0.80 \quad (7a)$$

$$0.01 < FL2/f2 < 0.15 \quad (8a)$$

$$1.00 < FL2/FL3 < 2.50 \quad (9a)$$

$$0.05 < f/X1 < 2.00 \quad (10a)$$

The numerical range of each conditional expression (3a) to (10a) may be set as follows:

$$0.10 < sk/f < 0.80 \quad (3b)$$

$$0.05 < sk/f2 < 0.20 \quad (4b)$$

$$0.010 < TG2/f2 < 0.071 \quad (5b)$$

$$0.30 < TG2/TG3 < 2.00 \quad (6b)$$

$$0.20 < DG12/f1 < 0.70 \quad (7b)$$

$$0.01 < FL2/f2 < 0.10 \quad (8b)$$

$$1.00 < FL2/FL3 < 2.00 \quad (9b)$$

$$0.05 < f/X1 < 1.00 \quad (10b)$$

The optical system according to this embodiment may correct the distortion and the lateral chromatic aberration among various aberrations by electrical image processing. Then, the entire lens diameter can be made small, the optical system can increase the imaging magnification during imaging at the short distance, the chromatic aberration, the curvature of field, etc. can be satisfactorily corrected during imaging at the short distance.

In addition, during focusing from infinity to the short distance, the optical system according to this embodiment can easily restrain the angle of view from changing during motion image capturing, by moving the second lens unit L2 and the third lens unit L3 to the object side.

Examples 1 to 5

Referring now to the accompanying drawings, a description will be given of examples of the optical system according to this embodiment.

Figure 1:
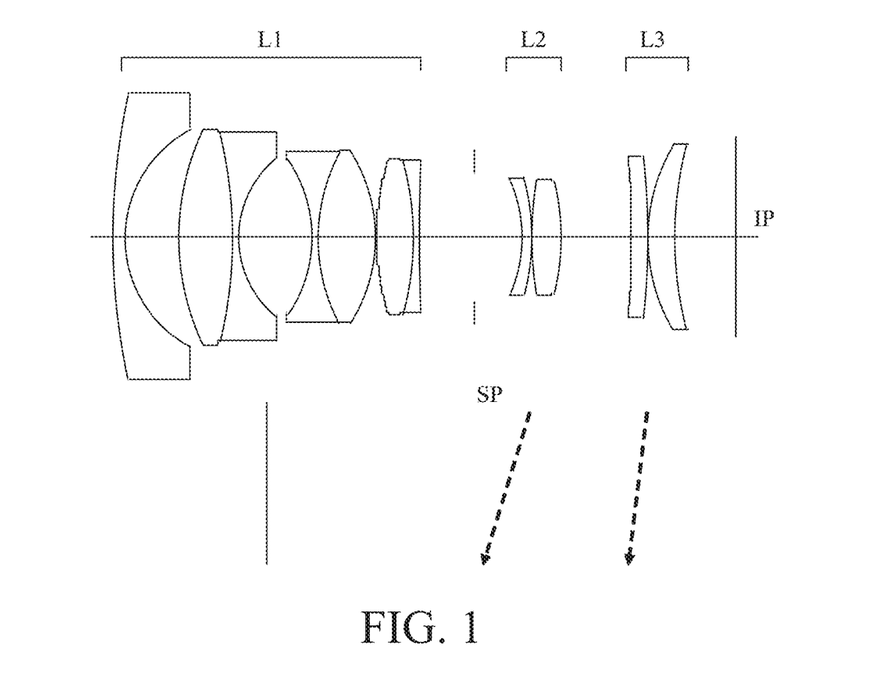
FIG. 1 is a lens sectional view of an optical system according to Example 1 in an in-focus state on infinity.
Figure 2:
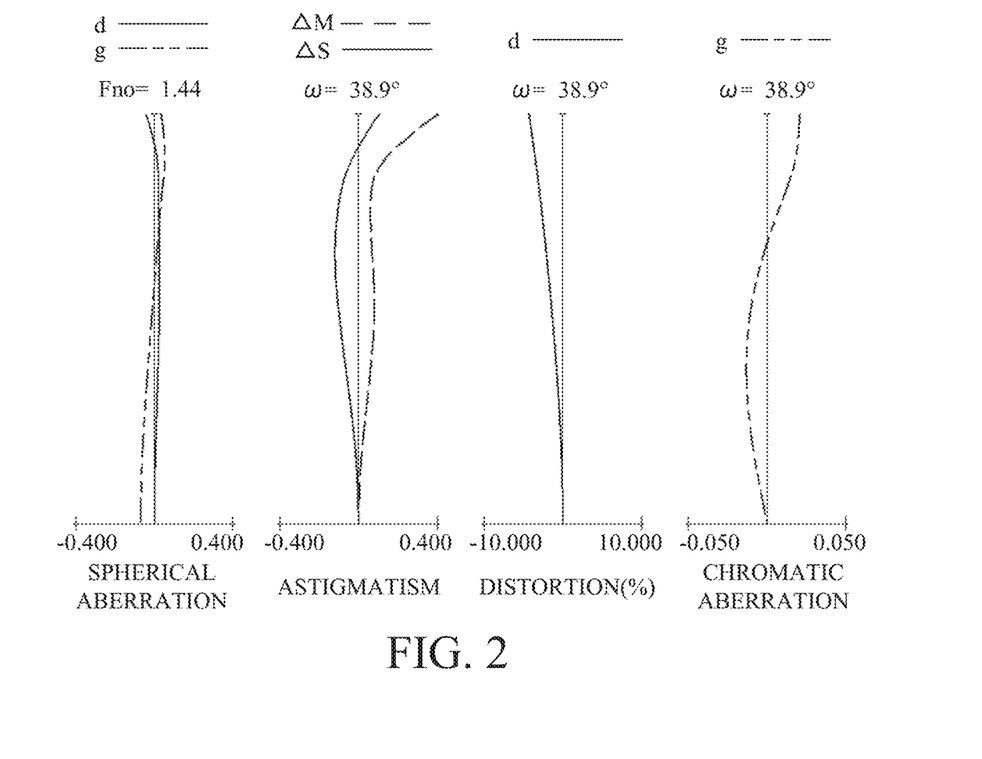
FIG. 2 illustrates various aberrations of the optical system according to Example 1 in the in-focus state on infinity.
Figure 3:
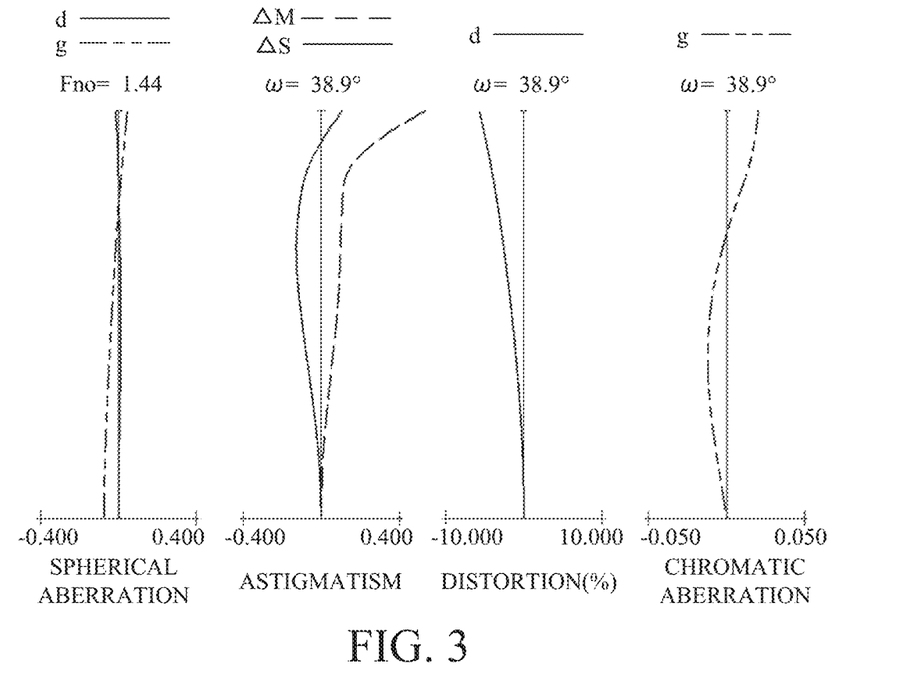
FIG. 3 illustrates various aberrations of the optical system according to Example 1 in an in-focus state on a short distance.

FIG. 1 is a lens sectional view in an optical system according to Example 1 in this embodiment in the in-focus state on infinity. FIGS. 2 and 3 are aberrational diagrams of the optical system in the in-focus states on infinity and the short distance, respectively.

Figure 4:
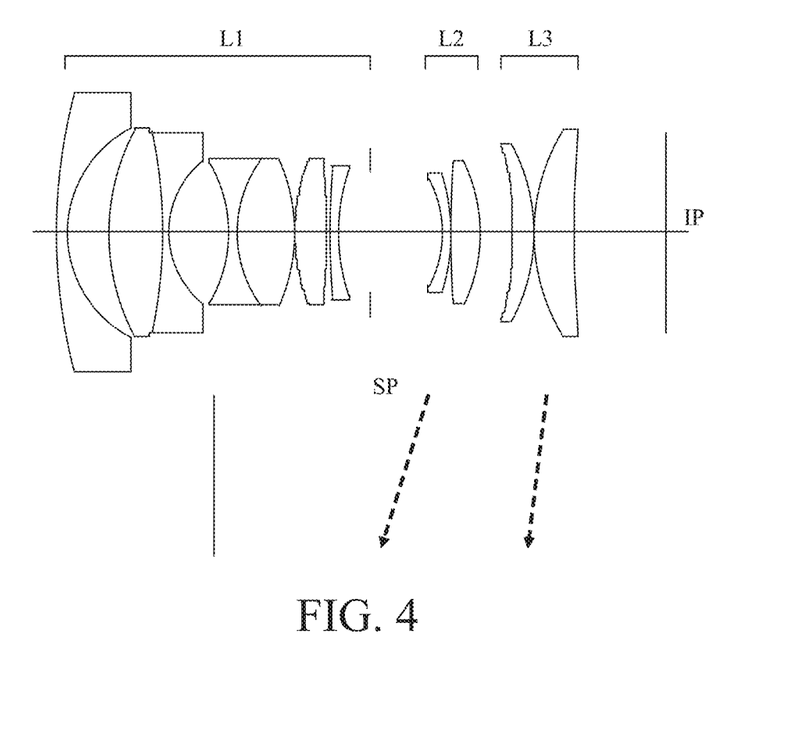
FIG. 4 is a lens sectional view of an optical system according to Example 2 in an in-focus state on infinity.
Figure 5:
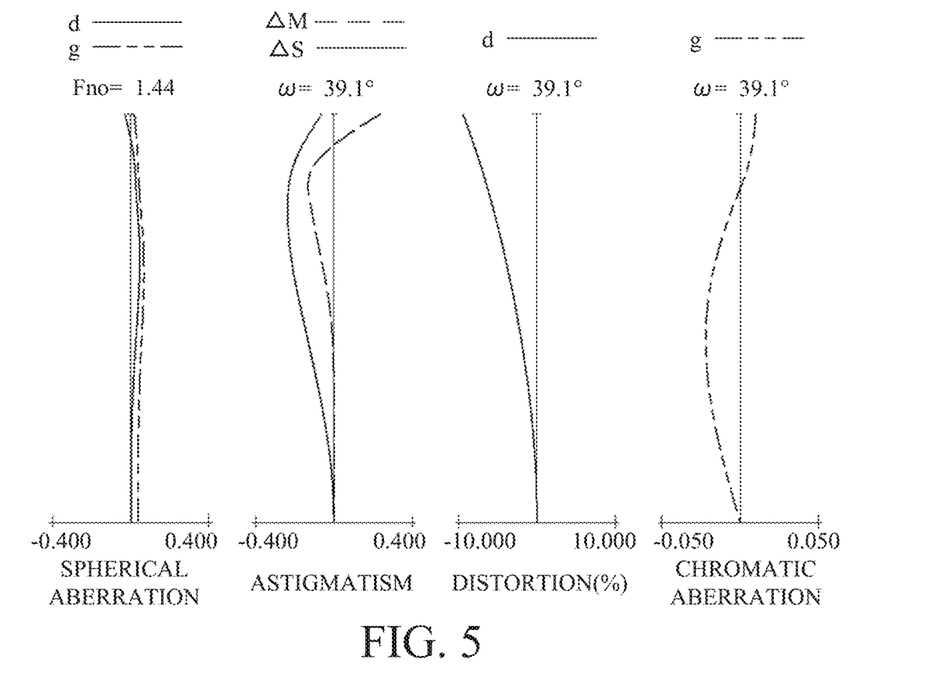
FIG. 5 illustrates various aberrations of the optical system according to Example 2 in the in-focus state on infinity.
Figure 6:
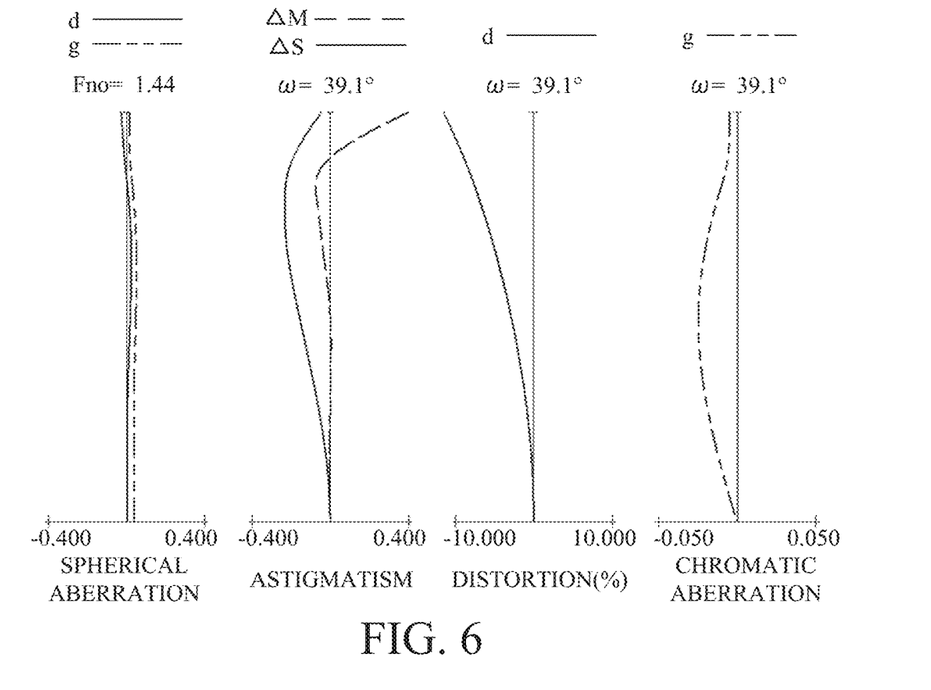
FIG. 6 illustrates various aberrations of the optical system according to Example 2 in an in-focus state on a short distance.

FIG. 4 is a lens sectional view in an optical system according to Example 2 in this embodiment in the in-focus state on infinity. FIGS. 5 and 6 are aberrational diagrams of the optical system in the in-focus states on infinity and the short distance, respectively.

Figure 7:
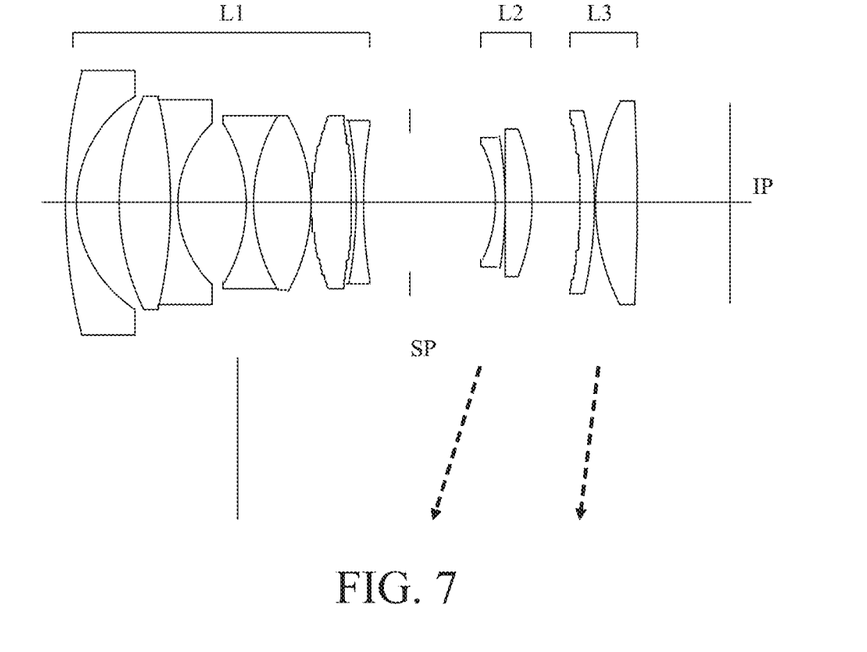
FIG. 7 is a lens sectional view of an optical system according to Example 3 in an in-focus state on infinity.
Figure 8:
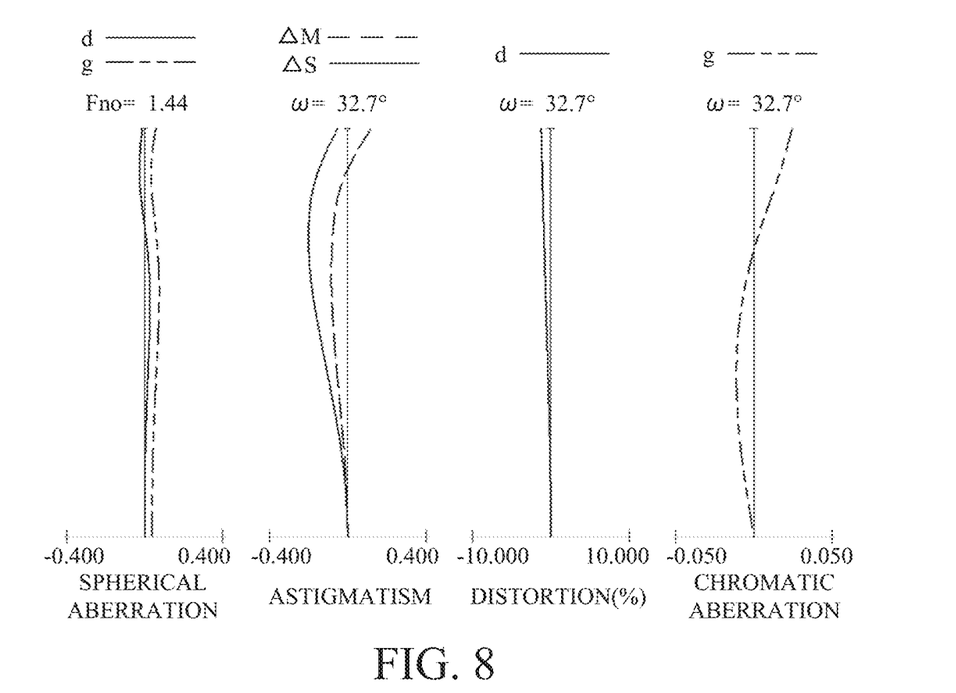
FIG. 8 illustrates various aberrations of the optical system according to Example 3 in an in-focus state on infinity.
Figure 9:
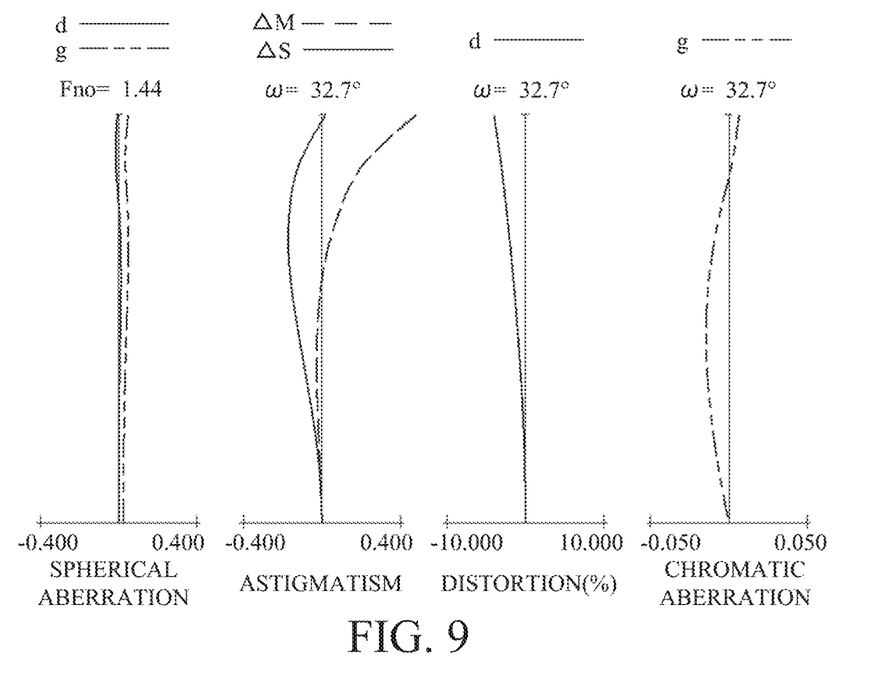
FIG. 9 illustrates various aberrations of the optical system according to Example 3 in the in-focus state on a short distance.

FIG. 7 is a lens sectional view in an optical system according to Example 3 in this embodiment in the in-focus state on infinity. FIGS. 8 and 9 are aberrational diagrams of the optical system in the in-focus states on infinity and the short distance, respectively.

Figure 10:
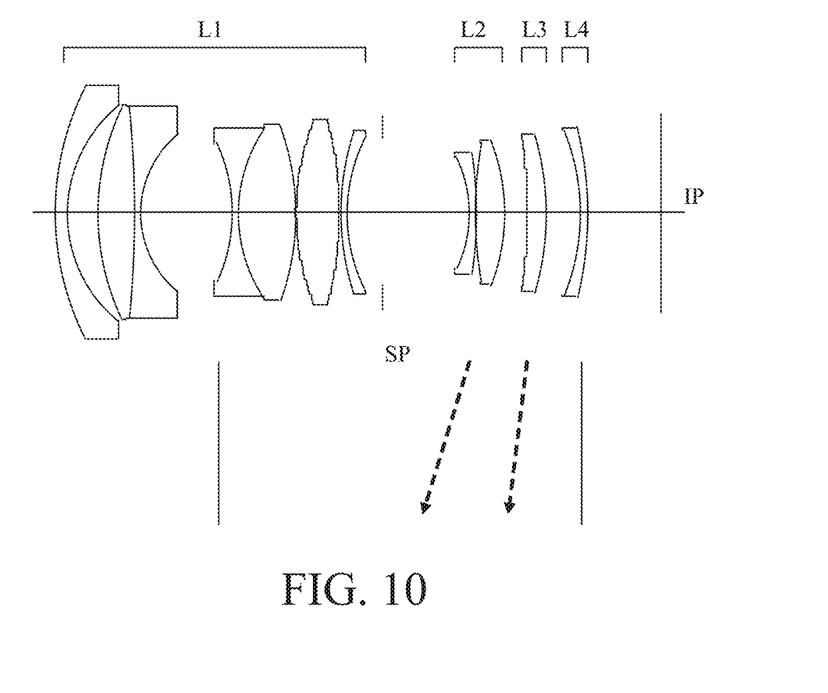
FIG. 10 is a lens sectional view of an optical system according to Example 4 in an in-focus state on infinity.
Figure 11:
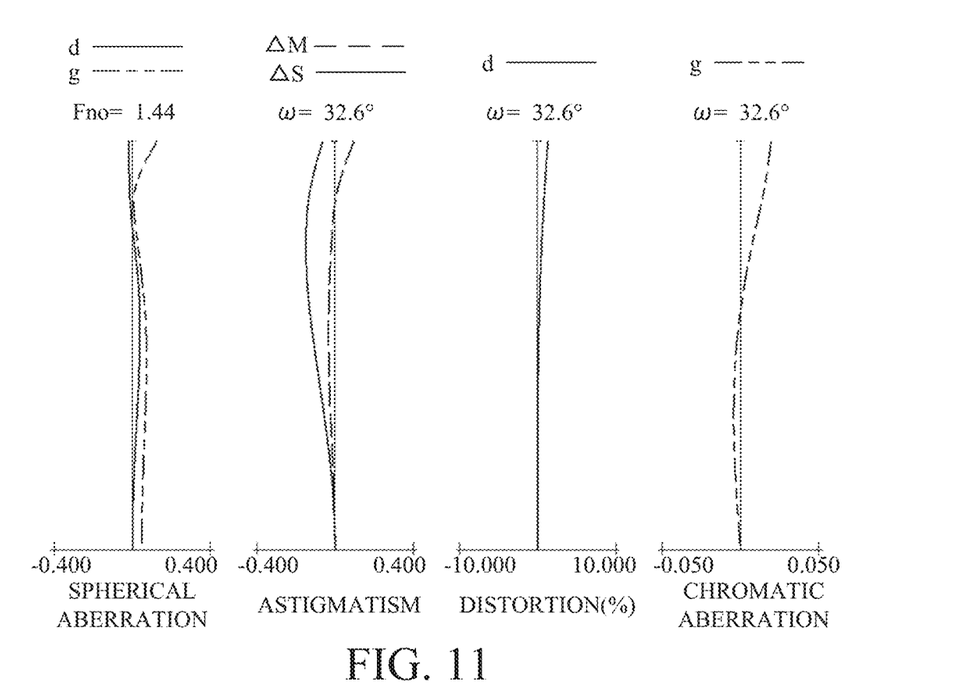
FIG. 11 illustrates various aberrations of the optical system according to Example 4 in the in-focus state on infinity.
Figure 12:
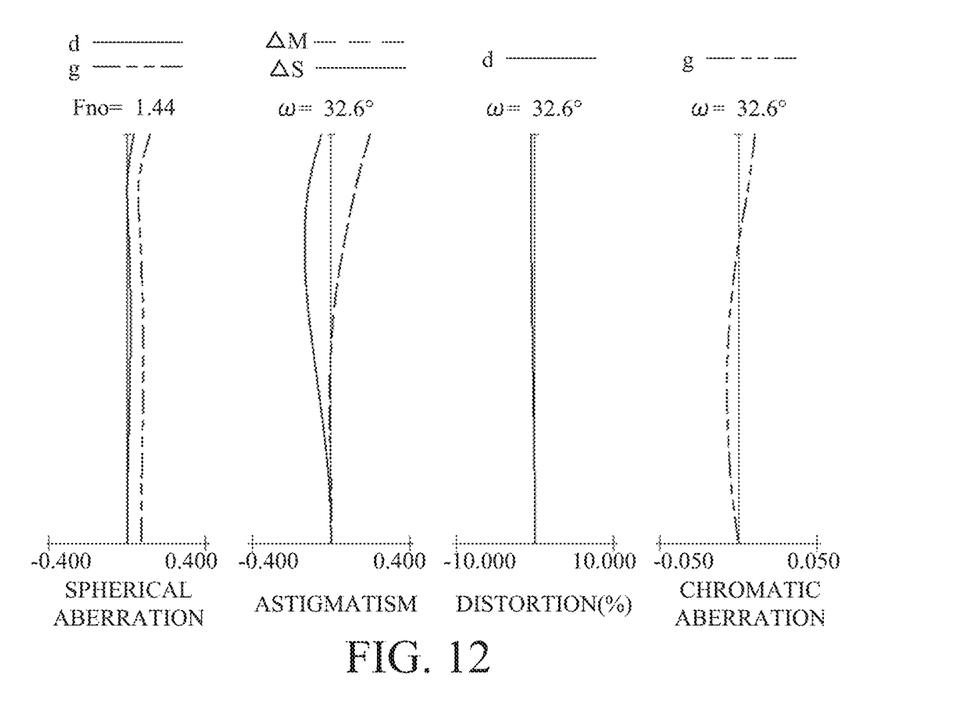
FIG. 12 illustrates various aberrations of the optical system according to Example 4 in an in-focus state on a short distance.

FIG. 10 is a lens sectional view in an optical system according to Example 4 in this embodiment in the in-focus state on infinity. FIGS. 11 and 12 are aberrational diagrams of the optical system in the in-focus states on infinity and the short distance, respectively.

Figure 13:
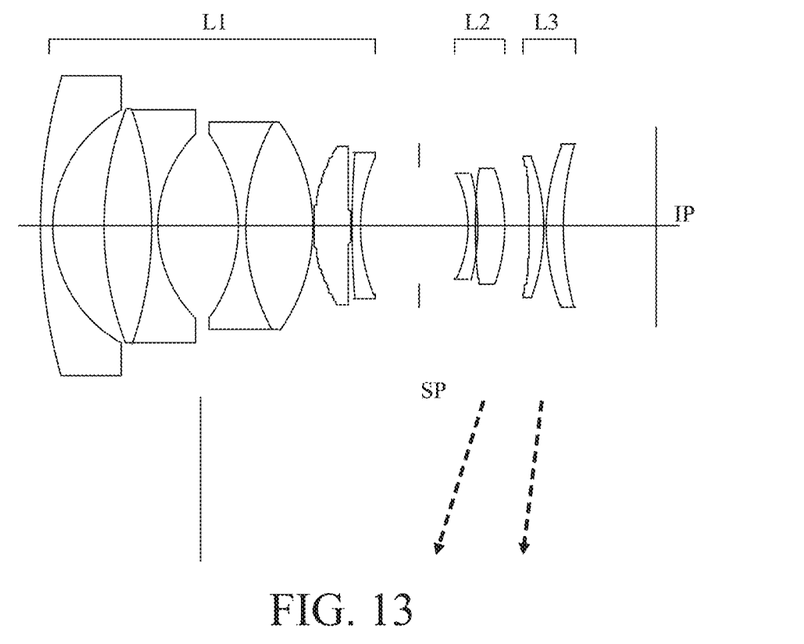
FIG. 13 is a lens sectional view of an optical system according to Example 5 in an in-focus state on infinity.
Figure 14:
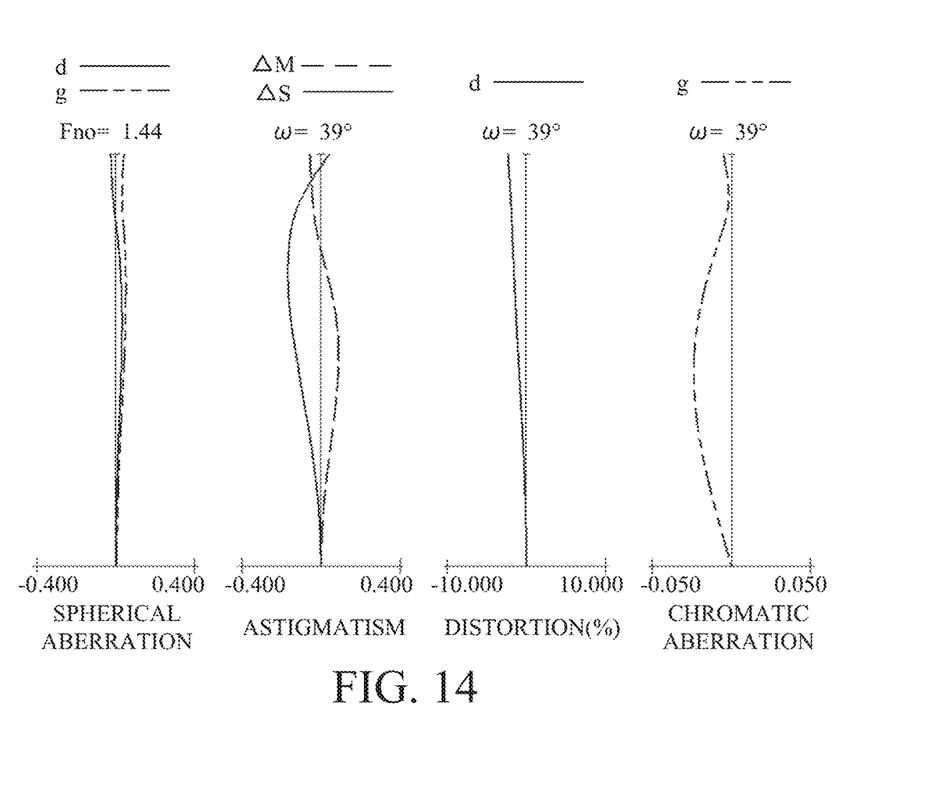
FIG. 14 illustrates various aberrations of the optical system according to Example 5 in the in-focus state on infinity.
Figure 15:
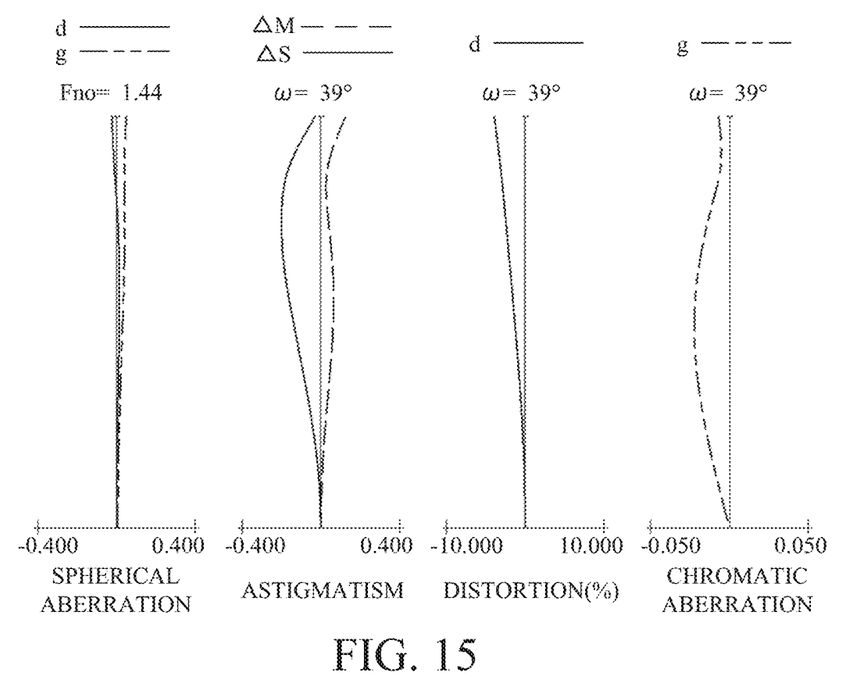
FIG. 15 is a diagram of various aberrations of the optical system of Example 5 in an in-focus state on a short distance.

FIG. 13 is a lens sectional view in an optical system according to Example 5 in this embodiment in the in-focus state on infinity. FIGS. 14 and 15 are aberrational diagrams of the optical system in the in-focus states on infinity and the short distance, respectively.

The optical systems according to Examples 1 to 5 are imaging lens systems used for an image pickup apparatus, and in each lens sectional view, the left side is the object side and the right side is the image side. In each lens sectional view according to Examples 1 to 5, L1 is a first lens unit having a positive refractive power, L2 is a second lens unit having a positive refractive power, and L3 is a third lens unit having a positive refractive power. SP is an aperture stop (diaphragm) and IP is an image plane. In the lens sectional view according to Example 4, L4 is a fourth lens unit having a negative refractive power. Examples 1 to 5 vary the magnification by moving the second lens unit L2 to the object side and by moving the third lens unit L3 to the object side as shown by arrows during focusing.

The configuration in each lens unit according to Examples 1 to 5 will be described. The first lens unit L1 includes a negative lens, a cemented lens including a positive lens and a negative lens, a cemented lens including a negative lens and a positive lens, a cemented lens including a positive lens and a negative lens or two lenses including a positive lens and a negative lens. This configuration can suppress the lateral chromatic aberration at the wide-angle end, reduces the power of the first lens unit L1, and contributes to the miniaturization. The second lens unit L2 includes two lenses including a negative lens and a positive lens. This configuration can suppress the sagittal coma aberration when the diameter is made larger, and easily make compact and light the second lens unit L2, which is the first focus lens unit, using the minimum required number of lenses. The third lens unit L3 includes one or two lenses. This configuration can suppress the sagittal coma aberration when the diameter is made larger, and easily make compact and light the third lens unit L3, which is the second focus lens unit, using the minimum required number of lenses. The fourth lens unit L4 according to Example 4 includes a single negative lens and contributes to a reduction of the overall length. The fourth lens unit L4 having the negative refractive power may be added even to the lens configurations shown in Examples 1, 2 and 3.

In each aberration diagram, d and g represent the d-line and the g-line, and ΔM and ΔS represent a meridional image plane and a sagittal image plane, respectively. F is an F-number and ω is a half angle of view (°). For the spherical aberration, the d-line (solid line) and the g-line (dotted line) are displayed. For the astigmatism, ΔM and ΔS for the d-line are displayed. For the distortion, the d-line is displayed. In the lateral chromatic aberration, the aberration of the g-line relative to the d-line is displayed, and in the lateral chromatic aberration, the aberration of the g-line relative to the d-line is displayed.

Numerical examples 1 to 5 corresponding to Examples 1 to 5 according to this embodiment will be shown below.

In the surface data according to each numerical example, the surface numbers are shown in order from the object side, r is a radius of curvature of each optical surface, d (mm) is an axial distance (distance on the optical axis) between an m-th surface and an (m+1)-th surface. However, m represents the number of a surface counted from the light incident side. nd represents a refractive index of each optical element relative to the d-line, and νd represents an Abbe number of the optical element. An Abbe number of a certain material is represented as follows:

$$\nu d=(Nd-1)/(NF-NC)$$

where Nd, NF, and NC are refractive indexes of the d-line (587.6 nm), F-line (486.1 nm), and C-line (656.3 nm) in the Fraunhofer line.

In each numerical example, all of d, a focal length (mm), an F-number, and a half angle of view (°) are values when the optical system according to each example focuses on an infinity object. "BF (backfocus)" represents a distance on the optical axis from the final surface of the lens (the lens surface closest to the image) to the paraxial image plane in terms of air equivalent length. The "overall lens length" is a length obtained by adding the backfocus to the distance on the optical axis from the frontmost surface (lens surface closest to the object) of the zoom lens to the final surface. The "lens unit" may include one or more lenses.

If the optical surface is an aspherical surface, a symbol * is added to the right side of the surface number. For the aspherical shape, X is a displacement amount from the surface apex in the optical axis direction, h is a height from the optical axis in the direction perpendicular to the optical axis, R is a paraxial radius of curvature, k is a conical constant, A4, A6, A8, A10, and A12 are aspherical coefficients of each order.

$$X=(h^2/R)/[1+\{1-(1+k)(h/R)^2\}^{1/2}+A4 \times h^4+A6 \times h^6+A8 \times h^8+A10 \times h^{10}+A12 \times h^{12}$$

"e±XX" in each aspherical coefficient means "×10$^{\pm XX}$".

Numerical Example 1

Unit mm

| Surface data | | | | |
|---|---|---|---|---|
| Surface number | r | d | nd | νd |
| 1 | 146.993 | 2.26 | 1.58267 | 46.4 |
| 2 | 26.699 | 11.90 | | |
| 3 | 54.581 | 11.21 | 2.00100 | 29.1 |
| 4 | −95.421 | 1.84 | 1.54072 | 47.2 |
| 5 | 22.307 | 15.32 | | |
| 6 | −29.242 | 2.00 | 1.60342 | 38.0 |
| 7 | 39.731 | 12.00 | 1.77250 | 49.6 |
| 8 | −34.655 | 0.40 | | |
| 9* | 55.986 | 7.42 | 1.76802 | 49.2 |
| 10 | −63.673 | 2.00 | 1.85478 | 24.8 |
| 11 | 1660.234 | (variable) | | |
| 12(diaphragm) | ∞ | 10.02 | | |
| 13 | −30.789 | 2.00 | 1.69895 | 30.1 |
| 14 | −47.478 | 0.27 | | |
| 15 | 76.544 | 6.00 | 1.49700 | 81.5 |
| 16 | −49.703 | (variable) | | |
| 17* | −656.310 | 3.00 | 1.76802 | 49.2 |
| 18 | −159.856 | 0.50 | | |
| 19 | 39.375 | 6.05 | 1.49700 | 81.5 |
| 20 | 81.209 | (variable) | | |
| Image plane | ∞ | | | |

Aspheric Data
Ninth Surface
 K=0.00000e+000 A4=−1.95201e−007 A6=5.56469e−010 A8=−1.84169e−012
Seventeenth Surface
 K=0.00000e+000 A4=−8.55938e−006 A6=−3.88001e−009

Various Data

|  |  |
|---|---|
| Zoom ratio | 1.00 |
| Focal length | 26.79 |
| F-number | 1.44 |
| Half angle of view(°) | 38.93 |
| Image height | 21.64 |
| Overall lens length | 134.78 |
| BF | 13.00 |
| d11 | 11.85 |
| d16 | 15.72 |
| d20 | 13.00 |

Zoom Lens Unit Data

| Unit | Starting surface | Focal length |
|---|---|---|
| 1 | 1 | 51.01 |
| 2 | 12 | 106.20 |
| 3 | 17 | 94.79 |

Numerical Example 2

Unit mm

Surface data

| Surface number | r | d | nd | vd |
|---|---|---|---|---|
| 1 | 119.621 | 2.26 | 1.58267 | 46.4 |
| 2 | 25.462 | 8.91 | | |
| 3 | 47.110 | 11.19 | 2.00100 | 29.1 |
| 4 | −104.870 | 1.84 | 1.54072 | 47.2 |
| 5 | 19.669 | 12.95 | | |
| 6 | −29.712 | 2.00 | 1.60342 | 38.0 |
| 7 | 26.908 | 12.00 | 1.77250 | 49.6 |
| 8 | −38.784 | 0.40 | | |
| 9* | 43.881 | 7.08 | 1.76802 | 49.2 |
| 10* | .93.453 | 0.40 | | |
| 11 | 175.819 | 2.00 | 1.85478 | 24.8 |
| 12 | 42.301 | 6.98 | | |
| 13(diaphragm) | ∞ | (variable) | | |
| 14 | −24.621 | 2.00 | 1.69895 | 30.1 |
| 15 | −42.889 | 0.27 | | |
| 16 | 254.901 | 6.00 | 1.49700 | 81.5 |
| 17 | −35.061 | (variable) | | |
| 18* | .99.313 | 4.00 | 1.53110 | 55.9 |
| 19 | −40.599 | 0.50 | | |
| 20 | 42.567 | 8.57 | 1.49700 | 81.5 |
| 21 | 303.803 | (variable) | | |
| Image plane | ∞ | | | |

Aspheric Data
Ninth surface
K=0.00000e+000 A4=4.42691 e−007 A6=−7.15232e−009 A8=3.90599e−011
Tenth Surface
K=0.00000e+000 A4=4.53281e−006 A6=−8.69501e−009 A8=5.39734e−011
Eighteenth Surface
K=0.00000e+000 A4=−6.49149e−006 A6=−1.15124e−009
Various Data

|  |  |
|---|---|
| Zoom ratio | 1.00 |
| Focal length | 26.62 |
| F-number | 1.44 |
| Half angle of view(°) | 39.10 |
| Image height | 21.64 |
| Overall lens length | 131.96 |
| BF | 20.00 |
| d13 | 15.13 |
| d17 | 7.48 |
| d21 | 20.00 |

Zoom Lens Unit Data

| Unit | Starting surface | Focal length |
|---|---|---|
| 1 | 1 | 67.64 |
| 2 | 14 | 175.19 |
| 3 | 18 | 54.82 |

Numerical Example 3

Unit mm

Surface data

| Surface number | r | d | nd | vd |
|---|---|---|---|---|
| 1 | 116.638 | 2.26 | 1.58267 | 46.4 |
| 2 | 27.122 | 9.30 | | |
| 3 | 52.499 | 11.03 | 2.00100 | 29.1 |
| 4 | −99.507 | 1.84 | 1.54072 | 47.2 |
| 5 | 24.138 | 14.45 | | |
| 6 | −32.665 | 2.00 | 1.60342 | 38.0 |
| 7 | 36.327 | 12.00 | 1.77250 | 49.6 |
| 8 | −38.237 | 0.40 | | |
| 9* | 49.984 | 8.91 | 1.76802 | 49.2 |
| 10* | −74.122 | 0.40 | | |
| 11 | −97.086 | 2.00 | 1.85478 | 24.8 |
| 12 | 102.731 | 9.99 | | |
| 13(diaphragm) | ∞ | (variable) | | |
| 14 | −29.000 | 2.00 | 1.69895 | 30.1 |
| 15 | −85.904 | 0.27 | | |
| 16 | 427.013 | 6.00 | 1.80400 | 46.6 |
| 17 | −43.849 | (variable) | | |
| 18* | −120.876 | 3.00 | 1.76802 | 49.2 |
| 19 | −86.309 | 0.50 | | |
| 20 | 48.129 | 9.02 | 1.49700 | 81.5 |
| 21 | −376.318 | (variable) | | |
| Image plane | ∞ | | | |

Aspheric Data
Ninth Surface
K=0.00000e+000 A4=6.46101e−007 A6=−1.56132e−009 A8=4.53013e−012
Tenth Surface
K=0.00000e+000 A4=1.93058e−006 A6=−2.70735e−009 A8=7.75395e−012
Eighteenth Surface
K=0.00000e+000 A4=−3.87737e−006 A6=−1.96727e−009
Various Data

|  |  |
|---|---|
| Zoom ratio | 1.00 |
| Focal length | 33.73 |
| F-number | 1.44 |
| Half angle of view(°) | 32.68 |
| Image height | 21.64 |
| Overall lens length | 143.92 |
| BF | 20.00 |
| d13 | 18.16 |
| d17 | 10.39 |
| d21 | 20.00 |

Zoom Lens Unit Data

| Unit | Starting surface | Focal length |
|---|---|---|
| 1 | 1 | 68.33 |
| 2 | 14 | 167.14 |
| 3 | 18 | 69.96 |

Numerical Example 4

Unit mm

Surface data

| Surface number | r | d | nd | vd |
|---|---|---|---|---|
| 1 | 60.679 | 2.26 | 1.69895 | 30.1 |
| 2 | 29.765 | 6.74 | | |
| 3 | 53.110 | 7.39 | 2.00100 | 29.1 |
| 4 | −237.078 | 1.84 | 1.51633 | 64.1 |
| 5 | 21.849 | 19.33 | | |
| 6 | −35.613 | 2.00 | 1.64769 | 33.8 |
| 7 | 33.010 | 12.00 | 1.77250 | 49.6 |
| 8 | −55.208 | 0.40 | | |
| 9* | 49.095 | 9.44 | 1.76802 | 49.2 |
| 10* | −80.124 | 0.40 | | |
| 11 | 56.508 | 1.26 | 1.76182 | 26.5 |
| 12 | 37.517 | 7.68 | | |
| 13(diaphragm) | ∞ | (variable) | | |
| 14 | −27.708 | 1.38 | 1.85478 | 24.8 |
| 15 | −86.615 | 0.27 | | |
| 16 | 87.508 | 6.00 | 1.77250 | 49.6 |
| 17 | −43.137 | (variable) | | |
| 18* | −421.067 | 4.00 | 1.76802 | 49.2 |
| 19 | −60.846 | (variable) | | |
| 20 | −46.936 | 1.64 | 1.51633 | 64.1 |
| 21 | −76.686 | (variable) | | |
| Image plane | ∞ | | | |

Aspheric Data
Ninth Surface
  $K=0.00000e+000$ $A4=-1.94572e-006$ $A6=-1.87272e-009$ $A8=2.79637e-013$
Tenth Surface
  $K=0.00000e+000$ $A4=4.97742e-008$ $A6=-1.52803e-009$ $A8=2.61249e-012$
Eighteenth Surface
  $K=0.00000e+000$ $A4=-8.41605e-006$ $A6=-3.79274e-009$
Various Data

| Zoom ratio | 1.00 |
|---|---|
| Focal length | 33.87 |
| F-number | 1.44 |
| Half angle of view(°) | 32.57 |
| Image height | 21.64 |
| Overall lens length | 131.26 |
| BF | 16.49 |
| d13 | 18.47 |
| d17 | 5.04 |
| d19 | 7.23 |
| d21 | 16.49 |

Zoom Lens Unit Data

| Unit | Starting surface | Focal length |
|---|---|---|
| 1 | 1 | 53.36 |
| 2 | 14 | 134.26 |
| 3 | 18 | 92.16 |
| 4 | 20 | −238.81 |

Numerical Example 5

Unit mm

Surface data

| Surface number | r | d | nd | vd |
|---|---|---|---|---|
| 1 | 118.771 | 2.26 | 1.70154 | 41.2 |
| 2 | 28.953 | 11.38 | | |
| 3 | 70.479 | 9.79 | 2.00100 | 29.1 |
| 4 | −77.769 | 1.84 | 1.54072 | 47.2 |
| 5 | 28.154 | 17.02 | | |
| 6 | −34.552 | 2.00 | 1.60342 | 38.0 |
| 7 | 46.372 | 14.34 | 1.77250 | 49.6 |
| 8 | −38.790 | 0.40 | | |
| 9* | 31.270 | 7.77 | 1.76802 | 49.2 |
| 10* | −306.540 | 0.40 | | |
| 11 | 205.045 | 2.00 | 1.85478 | 24.8 |
| 12 | 37.510 | (variable) | | |
| 13(diaphragm) | ∞ | 10.03 | | |
| 14 | −26.478 | 2.00 | 1.69895 | 30.1 |
| 15 | −45.919 | 0.27 | | |
| 16 | 112.739 | 6.00 | 1.49700 | 81.5 |
| 17 | −37.281 | (variable) | | |
| 18* | −155.139 | 3.00 | 1.53110 | 55.9 |
| 19 | −44.298 | 0.50 | | |
| 20 | 48.577 | 3.96 | 1.49700 | 81.5 |
| 21 | 67.258 | (variable) | | |
| Image plane | ∞ | | | |

Aspheric Data
Ninth Surface
  $K=0.00000e+000$ $A4=479445e-007$ $A6=-2.54333e-010$ $A8=3.69344e-013$
Tenth Surface
  $K=0.00000e+000$ $A4=3.41648e-006$ $A6=-2.47237e-009$ $A8=2.27433e-012$
Eighteenth Surface
  $K=0.00000e+000$ $A4=-1.18783e-005$ $A6=-3.76022e-009$
Various Data

| Zoom ratio | 1.00 |
|---|---|
| Focal length | 26.70 |
| F-number | 1.44 |
| Half angle of view(°) | 39.02 |
| Image height | 21.64 |
| Overall lens length | 133.24 |
| BF | 20.00 |
| d12 | 12.74 |
| d17 | 5.54 |
| d21 | 20.00 |

Zoom Lens Unit Data

| Unit | Starting surface | Focal length |
|---|---|---|
| 1 | 1 | 50.52 |
| 2 | 13 | 125.52 |
| 3 | 18 | 84.29 |

Table 1 below shows the numerical values corresponding to the conditional expressions (1) to (10) in each example.

|  | numerical example | | | | |
| --- | --- | --- | --- | --- | --- |
|  | 1 | 2 | 3 | 4 | 5 |
| (1) 0.01 < f1/f < 2.6 | 1.905 | 2.540 | 2.026 | 1.575 | 1.892 |
| (2) 0.7 < f2/f3 < 30 | 1.120 | 3.196 | 2.389 | 1.457 | 1.489 |
| (3) 0.01 < sk/f < 1.0 | 0.486 | 0.751 | 0.593 | 0.487 | 0.749 |
| (4) 0.01 < sk/f2 < 0.3 | 0.122 | 0.114 | 0.120 | 0.123 | 0.159 |
| (5) 0.01 < TG2/f2 < 0.1 | 0.078 | 0.047 | 0.049 | 0.057 | 0.066 |
| (6) 0.1 < TG2/TG3 < 3.0 | 0.866 | 0.633 | 0.660 | 1.910 | 1.109 |
| (7) 0.2 < DG12/f1 < 1.0 | 0.429 | 0.327 | 0.412 | 0.490 | 0.451 |
| (8) 0.01 < FL2/f2 < 0.2 | 0.017 | 0.017 | 0.029 | 0.029 | 0.027 |
| (9) 1.0 < FL2/FL3 < 3.0 | 1.513 | 1.803 | 1.477 | 1.207 | 1.776 |
| (10) 0.05 < f/X1 < 3.0 | 0.474 | 0.416 | 0.486 | 0.560 | 0.520 |

Figure 16:
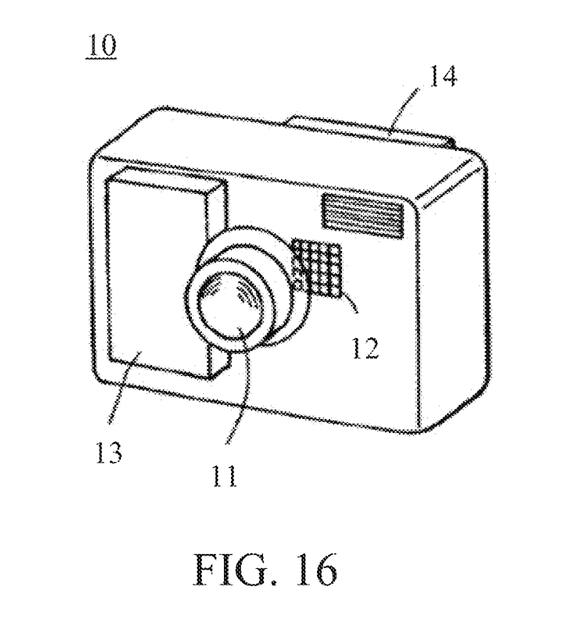
FIG. 16 is a schematic view of a principal part in an illustrative image pickup apparatus.
Figure 17:
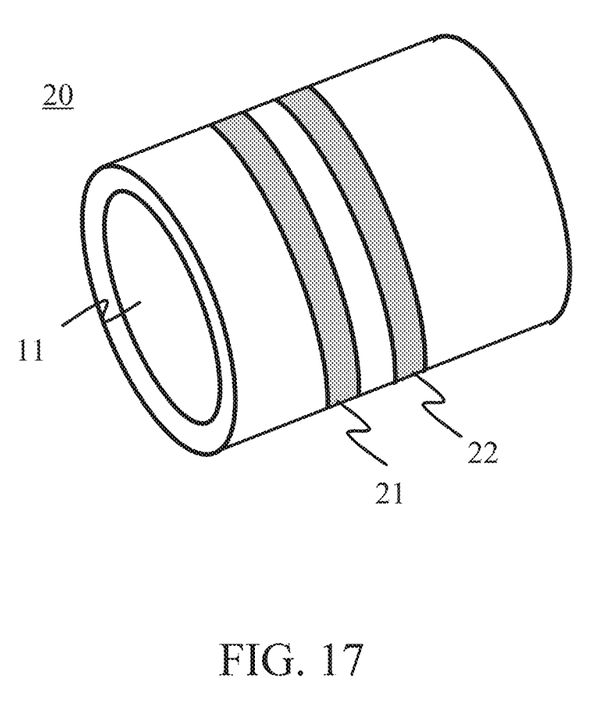
FIG. 17 is an external perspective view of the lens apparatus according to this embodiment.

Referring now to FIGS. 16 and 17, a description will be given of an embodiment of an image pickup apparatus and a lens apparatus using the optical system shown in each example.

FIG. 16 is a schematic view of principal part of a digital still camera (image pickup apparatus) using an optical system according to this embodiment as an imaging optical system. In FIG. 16, reference numeral 10 denotes a camera body, reference numeral 11 denotes an imaging optical system including the optical system according to this embodiment, and reference numeral 12 is a solid-state image sensor (photoelectric conversion element), such as a CCD sensor and CMOS sensor, built in the camera body and configured to receive an object image formed by the imaging optical system 11. Reference numeral 13 denotes a recorder configured to record the object image received by the image sensor 12, and reference numeral 14 denotes a viewfinder used to observe an object image displayed on a display device (not illustrated). The display device includes a liquid crystal panel or the like, and displays an object image formed on the image sensor 12. The camera body 10 may be a so-called single-lens reflex camera having a quick turn mirror, or a so-called mirrorless camera having no quick turn mirror.

FIG. 17 is a schematic external view of a lens apparatus 20 such as an interchangeable lens. The lens apparatus 20 includes the imaging optical system 11. The lens apparatus 20 may have a focus operating unit 21 and an operating unit 22 for changing a mode. When the user operates the focus operating unit 21, the arrangement of the lens unit of the imaging optical system 11 may be mechanically or electrically changed, and the focal position may be changed. The user may operate the operating unit 22 for changing the mode, so as to mechanically or electrically change the arrangement of the lens units in the imaging optical system 11 and to change the aberrations.

By applying the optical system according to this embodiment to the image pickup apparatus and the lens apparatus in this way, the image pickup apparatus and the lens apparatus can be obtained each of which can satisfactorily correct a chromatic aberration and a curvature of field during imaging at all object distances from infinity to a short distance while reducing an overall length and a size of an entire focus unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-011125, filed on Jan. 27, 2020, which is hereby incorporated by reference herein in its entirety.

What is claimed is:

1. An optical system comprising, in order from an object side to an image side, a first lens unit having a positive refractive power, a second lens unit having a positive refractive power, and a third lens unit having a positive refractive power, wherein a distance between adjacent lens units changes when focusing, wherein an aperture stop is disposed between the first lens unit and the second lens unit, wherein for focusing from infinity to a short distance, the first lens unit-is fixed, and the second lens unit and the third lens unit are moved so that a distance between the second lens unit and the third lens unit changes, wherein the first lens unit includes a plurality of negative lenses, and wherein the following inequalities are satisfied:

$$0.01 < f1/f \leq 2.026$$

$$0.70 < f2/f3 < 30.00$$

where f is a focal length of the optical system in an in-focus state on infinity, and f1, f2, and f3 are focal lengths of the first lens unit, the second lens unit, and the third lens unit, respectively.

2. The optical system according to claim 1, wherein the following inequality is satisfied:

$$0.01 < sk/f < 1.00$$

where sk is a backfocus of the optical system in the in-focus state on infinity.

3. The optical system according to claim 1, wherein the following inequality is satisfied:

$$0.01 < sk/f2 < 0.30$$

where sk is a backfocus of the optical system in the in-focus state on infinity.

4. The optical system according to claim 1, wherein the following inequality is satisfied:

$$0.01 < TG2/f2 < 0.10$$

where TG2 is a thickness of the second lens unit in an optical axis direction.

5. The optical system according to claim 1, wherein the following inequality is satisfied:

$$0.10 < TG2/TG3 < 3.00$$

where TG2 is a thickness of the second lens unit in an optical axis direction, and TG3 is a thickness of the third lens unit in the optical axis direction.

6. The optical system according to claim 1, wherein the following inequality is satisfied:

$$0.20 < DG12/f1 < 1.00$$

where DG12 is a distance between the first lens unit and the second lens unit.

7. The optical system according to claim 1, wherein the following inequality is satisfied:

$$0.01 < FL2/f2 < 0.20$$

where FL2 is a moving amount of the second lens unit from focusing on infinity to focusing on an object 500 mm apart from an image plane.

8. The optical system according to claim 1, wherein the following inequality is satisfied:

$$1.00 < FL2/FL3 < 3.00$$

where FL2 and FL3 are moving amounts of the second lens unit and the third lens unit from focusing on infinity to focusing on an object 500 mm apart from the image plane, respectively.

9. The optical system according to claim 1, wherein the following inequality is satisfied:

$$0.05 < f/X1 < 3.00$$

where X1 is a distance from the aperture stop to the image plane during focusing on infinity.

10. The optical system according to claim 1, wherein the first lens unit includes, in order from the object side to the image side:
a negative lens;
a cemented lens of a positive lens and a negative lens;
a cemented lens of a negative lens and a positive lens; and
a cemented lens of a positive lens and a negative lens or two lenses including a positive lens and a negative lens.

11. The optical system according to claim 1, wherein the second lens unit includes two lenses that are a negative lens and a positive lens arranged in order from the object side to the image side.

12. The optical system according to claim 1, wherein the third lens unit includes one or two lenses.

13. The optical system according to claim 1, further comprising a fourth lens unit including a single negative lens disposed on the image side of the third lens unit.

14. The optical system according to claim 1,
wherein the first lens unit includes a negative single lens disposed at most object side and a cemented lens disposed adjacent to the negative single lens, and
wherein the cemented lens is configured by cementing a positive lens and a negative lens which are arranged in order from the object side to the image side.

15. The optical system according to claim 1,
wherein the first lens unit includes a first cemented lens and a second cemented lens disposed adjacent to the first cemented lens on the image side, and
wherein a most image side lens surface of the first cemented lens is a concave surface toward the image side, and a most object side lens surface of the second cemented lens is a concave surface toward the object side.

16. The optical system according to claim 1,
wherein for focusing from infinity to a short distance, the aperture stop is fixed.

17. The optical system according to claim 1, wherein the optical system satisfies the following inequality:

$$1.575 \le f1/f \le 2.026.$$

18. The optical system according to claim 1, wherein the optical system satisfies the following inequality:

$$1.120 \le f2/f3 \le 3.196.$$

19. The optical system according to claim 1, wherein the optical system satisfies the following inequality:

$$0.327 \le DG12/f1 < 0.70$$

where DG12 is a distance between the first lens unit and the second lens unit.

20. The optical system according to claim 1, wherein the total number of lens units arranged in the optical system is three.

21. The optical system according to claim 1, wherein the total number of lens units arranged in the optical system is four.

22. The optical system according to claim 1, wherein the second lens unit consists of two or fewer lenses.

23. The optical system according to claim 1, wherein the third lens unit consists of two or fewer lenses.

24. The optical system according to claim 1, wherein the second lens unit has a negative meniscus lens with a concave surface facing toward the object.

25. An image pickup apparatus comprising:
an optical system; and
an image sensor configured to receive an image formed by the optical system,
wherein the optical system includes, in order from an object side to an image side, a first lens unit having a positive refractive power, a second lens unit having a positive refractive power, and a third lens unit having a positive refractive power,
wherein a distance between adjacent lens units changes when focusing,
wherein an aperture stop is disposed between the first lens unit and the second lens unit,
wherein for focusing from infinity to a short distance, the first lens unit is fixed, and the second lens unit and the third lens unit are moved so that a distance between the second lens unit and the third lens unit changes,
wherein the first lens unit includes a plurality of negative lenses, and
wherein the following inequalities are satisfied:

$$0.01 < f1/f \le 2.026$$

$$0.70 < f2/f3 < 30.00$$

where f is a focal length of the optical system in an in-focus state on infinity, and f1, f2, and f3 are focal lengths of the first lens unit, the second lens unit, and the third lens unit, respectively.

26. A lens apparatus comprising an optical system,
wherein the optical system includes, in order from an object side to an image side, a first lens unit having a positive refractive power, a second lens unit having a positive refractive power, and a third lens unit having a positive refractive power,
wherein a distance between adjacent lens units changes when focusing,
wherein an aperture stop is disposed between the first lens unit and the second lens unit,
wherein for focusing from infinity to a short distance, the first lens unit is fixed, and the second lens unit and the third lens unit are moved so that a distance between the second lens unit and the third lens unit changes,
wherein the first lens unit includes a plurality of negative lenses, and
wherein the following inequalities are satisfied:

$$0.01 < f1/f \le 2.026$$

$$0.70 < f2/f3 < 30.00$$

where f is a focal length of the optical system in an in-focus state on infinity, and f1, f2, and f3 are focal lengths of the first lens unit, the second lens unit, and the third lens unit, respectively.

* * * * *